Inventors,
BELA BARENYI
KARL WILFERT
By Dicke and Padlon
ATTORNEYS

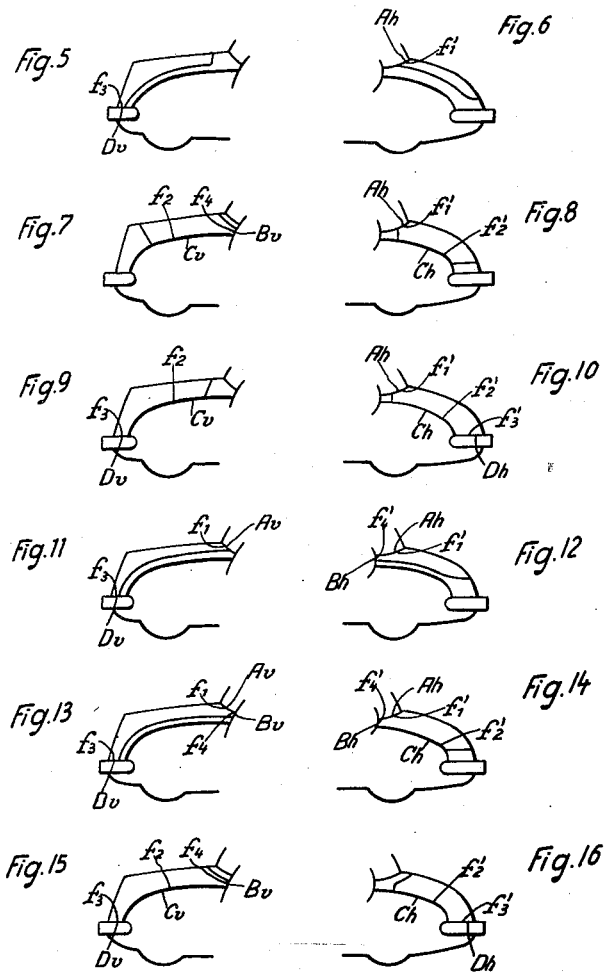

United States Patent Office 2,778,673
Patented Jan. 22, 1957

2,778,673

MOTOR VEHICLE BODY FIXED AND HINGED PANEL JOINTS CONSTRUCTION

Béla Barényi, Stuttgart-Rohr, and Karl Wilfert, Stuttgart-Degerloch, Germany, assignors to Daimler-Benz Aktiengesellschaft, Stuttgart-Unterturkheim, Germany Application December 29, 1952, Serial No. 328,368

Claims priority, application Germany December 28, 1951

2 Claims. (Cl. 296—28)

Our invention relates to a motor vehicle body and particularly to the manner in which the fixedly attached walls of the body and the liftable or movable portions thereof, such as hoods, the lids of the baggage compartment or the like, join each other.

Prior to our invention, the fixedly attached body walls and the movable walls were disposed in flush relationship. Such an arrangement, however, is highly impractical with respect to the manufacturing costs involved since complicated manufacturing equipment is required in order to afford an accurately flush relationship of the curved edges which may be bent in different planes. Moreover, in such an arrangement the body walls must be rendered so stiff that the relative location of the wall elements in flush relationship will not be perceivably disturbed even in the event of a considerable warping or twisting of the vehicle.

It is an object of the present invention to simplify the manufacture of the vehicle body and to reduce the cost thereof. According to the present invention, the difficulties pointed out hereinabove are eliminated by a coincidence of the edges of an upper body portion separate from the remaining walls of the body, for example, removable or pivotal, particularly of the hood or of the lid of a rear compartment, with the lines of intersection of two body wall faces joining one another at an angle, such coincidence existing at least on two sides of the edges and serving the purpose of forming the separable joints.

By the coincidence of the joints with the lines of intersection of walls meeting at an angle, we are able to completely eliminate the necessity of providing for the relative flush arrangement at the juncture of the fixedly attached wall portions and the movable wall portion and the necessity of accurately fitting the meeting faces. Moreover, we dispose the separable joint at such a location of the body walls as lends itself to a subdivision of the wall. Therefore, the cost of manufacture of the body will be considerably reduced.

Wherever possible, the body according to the present invention is so shaped that substantially on all sides the edges of a separable or movable body wall portion coincide with the lines where body walls meet at an angle, such arrangement being provided to the fullest extent of the availability of such body walls extending at an angle to the surface of the separable or movable body wall portion.

Preferably, a separable or movable top end element which borders on the lower edge of the middle body portion and on lateral wall elements housing the wheels is confined by the door gap on the side facing the door. Moreover, the top end element of the bow and the top end element of the stern of the body are designed in accordance with the present invention explained heretofore.

In the drawings a number of different embodiments of the present invention and, in comparison therewith, a body of orthodox design are represented.

Figure 1:
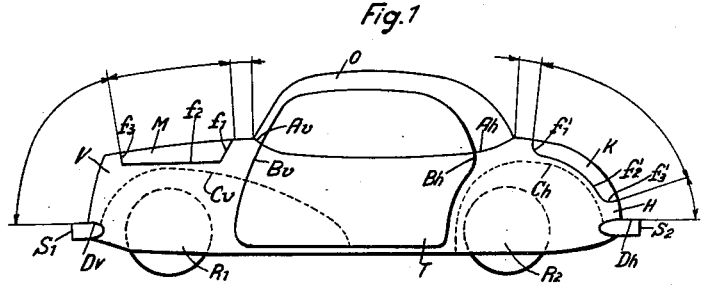
Fig. 1 is an elevation of an orthodox body of a motor vehicle.
Figure 2:
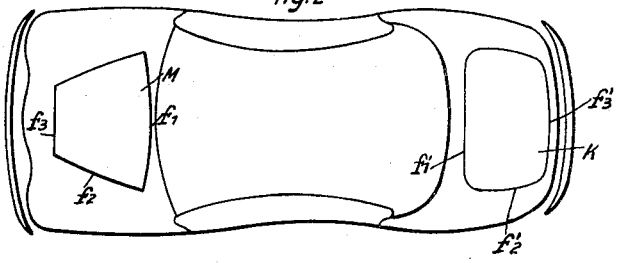
Fig. 2 is a plan view of the latter.

In Figs. 1 and 2 of the drawings O denotes the top of the middle section of the vehicle; $R_1$ denotes the lateral elements constituting housings encasing the front wheels of the vehicle; $R_2$ denotes the lateral elements constituting housings encasing the rear wheels of the vehicle; T denotes the door of the vehicle; $S_1$ denotes the front bumper; $S_2$ denotes the rear bumper; V is the top portion of the bow of the body provided with the motor hood or other movable wall element M; and H denotes the top portion of the stern of the vehicle body provided with the lid of the baggage compartment or other movable wall element K.

As mentioned above, Figs. 1 and 2 illustrate the orthodox structure of the prior art showing the motor hood M and the lid K of the baggage compartment, the joints $f_1$, $f_2$ and $f_3$ of the motor hood M and the joints $f_1'$, $f_2'$ and $f_3'$ of the lid K of the baggage compartment being located within the surfaces of the body top walls V and H, the rigid walls and the movable walls being disposed in flush or essentially parallel relationship where they meet or join.

Such flush relationship of the joining edges requires a complicated and expensive process of manufacture. At no point do such joints coincide with the lines $A_v$, $C_v$, $D_v$, $A_h$, $C_h$ and $D_h$ of the intersection formed by such wall portions of the body elements O/V, $R_1$/V and $D_v$/V as meet at an angle at the bow and at the stern of the vehicle. Similarly, the joints referred to are spaced from the door gaps $B_v$ and $B_h$.

Figure 3:
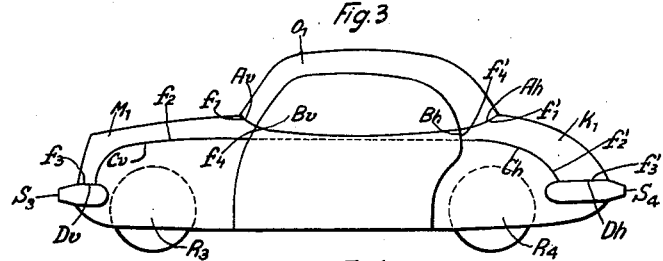
Fig. 3 is an elevation of a body of a motor vehicle incorporating the present invention.
Figure 4:
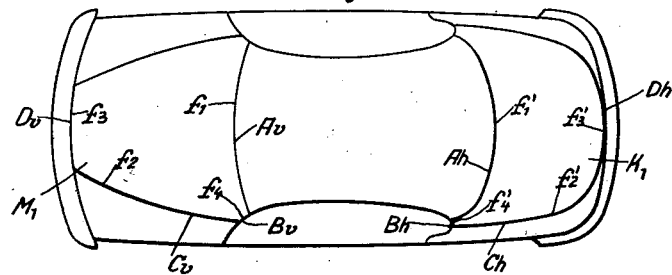
Fig. 4 is a plan view of the body shown in Fig. 3, and Figs. 5–16 illustrate further forms of the present invention, the figures bearing odd numbers illustrating the "bow," i. e. the front end, of the vehicle and the figures bearing even numbers illustrating the "stern," i. e. the rear end, of the vehicle.

In contrast to such prior art construction Figs. 3 and 4 illustrate an embodiment of the present invention in its most perfect form. In this embodiment the joint line $f_1$ coincides with the line of intersection $A_v$; the joint line $f_2$ coincides with the line $C_v$ of the intersection; and the joint line $f_3$ coincides with the line $D_v$ of the intersection. Moreover, the motor hood $M_1$ extends rearwardly within the space between the windshield and the lateral wheel housings $R_3$ to such an extent that the rear edge $f_4$ borders on the door as indicated at $B_v$. The same is true of the lid $K_1$ of the baggage compartment with respect to the joint lines $f_1'$, $f_2'$, $f_3'$ and $f_4'$.

Even though the joints $f_4$ and $f_4'$ do not coincide with a line of intersection of two body walls meeting at an angle, the coincidence of the rear edge of the motor hood and of the front edge of the baggage compartment lid involves no disadvantage regarding the manufacture, but offers a material advantage compared with the orthodox design as at such places gaps must be provided anyway.

Where a disposition of the joints in the lines of intersection in walls meeting at an angle or a coincidence with the door gaps is not desired for special reasons of design or for reasons of spacial disposition, according to the present invention the vehicle body may be so designed as to provide for a partial coincidence as shown in Figs. 5–16, for instance. Thus, such figures illustrate the coincidence:

In Fig. 5 of the joint $f_3$ with the line $D_v$ of intersection.
In Fig. 6 of the joint $f_1$ with the line $A_h$ of intersection.
In Fig. 7 of the joint $f_2$ with the line $C_v$ of intersection and of the joint $f_4$ with the door gap $B_v$.

In Fig. 8 of the joint $f_2'$ with the line $C_h$ of intersection and of the joint $f_1'$ with the line $A_h$ of intersection.

In Fig. 9 of the joint $f_2$ with the line $C_v$ of intersection and of the joint $f_3$ with the line $D_v$ of intersection.

In Fig. 10 of the joint $f_1'$ with the line $A_h$ of intersection, of the joint $f_2'$ with the line $C_h$ of intersection, and of the joint $f_3'$ with the line $D_h$ of intersection.

In Fig. 11 of the joint $f_1$ with the line $A_v$ of intersection and of the joint $f_3$ with the line $D_v$ of intersection.

In Fig. 12 of the joint $f_1'$ with the line $A_h$ of intersection and of the joint $f_4'$ with the door gap $B_h$.

In Fig. 13 of the joint $f_1$ with the line $A_v$ of intersection, of the joint $f_3$ with the line $D_v$ of intersection, and of the joint $f_4$ with the door gap $B_v$.

In Fig. 14 of the joint $f_1'$ with the line $A_h$ of intersection, of the joint $f_2'$ with the line $C_h$ of intersection, and of the joint $f_4'$ with the door gap $B_h$.

In Fig. 15 of the joint $f_2$ with the line $C_v$ of intersection, of the joint $f_3$ with the line $D_v$ of intersection, and of the joint $f_4$ with the door gap $B_v$.

In Fig. 16 of the joint $f_2'$ with the line $C_h$ of intersection and of the joint $f_3'$ with the line $D_h$ of intersection.

It stands to reason that the design of the bow of the vehicle shown is in all cases similarly applicable to the stern of the body or vice versa. If desired, the bow or the stern may be constructed in accordance with the invention. Preferably, however, both the bow and the stern are constructed in accordance with the present invention. The arrangements at the bow and at the stern may be combined with each other in any desired manner.

While we have described a number of preferred embodiments of our invention, it is to be clearly understood that the invention is not limited to the details shown but is capable of numerous modifications within the scope of the appended claims.

What we claim is:

1. A passenger motor vehicle body forming a passenger compartment comprising a top covering said passenger compartment and having a transversely extending front wall forming the windshield and a transversely extending rear wall, upwardly extending lateral housing elements encasing the vehicle wheels and forming fender portions therefor, a transversely extending bumper at the front end of the vehicle, and a hood extending forwardly from the lower edge of said transversely extending front wall between the lateral housing elements encasing the front wheels and downwardly to said front bumper, said top, said lateral housing elements and said front bumper being fixedly attached to the vehicle while said hood is mounted to be movable with respect thereto, the edges of the panels constituting said hood on all sides thereof forming lines of intersection with the edges of the panels constituting the fixedly attached body parts consisting of said transversely extending front wall, the lateral housing elements for the front wheels and said front bumper, the forwardly and downwardly extending parts of said hood and said fixedly attached body parts each having panel portions adjacent the lines of intersection thereof of substantial extent disposed at considerable angles to one another so that inequalities or non-parallelism of adjoining edges of the panels are not readily noticeable.

2. A motor vehicle body according to claim 1, further comprising a transversely extending rear bumper, and a lid for the trunk of the vehicle extending rearwardly from the lower edge of said transversely extending rear wall between the lateral housing elements encasing the rear wheels and downwardly to said rear bumper, said lid being mounted to be movable with respect to the lateral housing elements encasing the rear vehicle wheels, said transversely extending rear wall and said rear bumper, the edges of the panels constituting said lid on all sides thereof forming lines of intersection with the edges of the panels constituting the fixedly attached body parts consisting of the lateral housings encasing the rear wheels, said transversely extending rear wall and said rear bumper, and the rearwardly and downwardly extending parts of said lid and said last-mentioned fixedly attached body parts each having panel portions adjacent said last-mentioned lines of intersection of substantial extent disposed at considerable angles to one another so that inequalities or non-parallelism of adjoining edges of the panels are not readily noticeable.

References Cited in the file of this patent

UNITED STATES PATENTS

| 753,428 | Pearson | Mar. 1, 1904 |
| 1,794,323 | Riley | Feb. 24, 1931 |
| 1,858,743 | Langstreth | May 17, 1932 |
| 2,204,991 | Haltenberger | June 18, 1940 |
| 2,525,339 | Chausson | Oct. 10, 1950 |
| 2,575,211 | Flacke | Nov. 13, 1951 |
| 2,606,625 | Paton | Aug. 12, 1952 |

FOREIGN PATENTS

| 550,603 | Great Britain | Jan. 15, 1943 |